US008527639B1

(12) United States Patent
Liskov et al.

(10) Patent No.: US 8,527,639 A0
(45) Date of Patent: Sep. 3, 2013

(54) CONTENT SERVER SELECTION FOR ACCESSING CONTENT IN A CONTENT DISTRIBUTION NETWORK

(75) Inventors: Barbara Liskov, Waltham, MA (US); James O'Toole, Somerville, MA (US); M. Frans Kaashoek, Lexington, MA (US); Kirk Johnson, Boulder, CO (US)

(73) Assignee: Cisco Technology, Inc., San Jose, CA (US)

( * ) Notice: Subject to any disclaimer, the term of this patent is extended or adjusted under 35 U.S.C. 154(b) by 2022 days.

(21) Appl. No.: 09/642,165

(22) Filed: Aug. 18, 2000

(51) Int. Cl.
*G06F 15/173* (2006.01)
*G06F 15/16* (2006.01)

(52) U.S. Cl.
USPC ............ 709/228; 709/203; 709/238; 709/245

(58) Field of Classification Search
USPC ................. 709/229, 241, 200, 239, 245, 246, 709/201, 224, 236, 238, 223, 228
See application file for complete search history.

(56) References Cited

U.S. PATENT DOCUMENTS

| | | | | |
|---|---|---|---|---|
| 5,870,562 A * | 2/1999 | Butman et al. | ................ | 709/238 |
| 5,881,238 A | 3/1999 | Aman et al. | | |
| 6,035,055 A * | 3/2000 | Wang et al. | ................... | 382/118 |
| 6,041,041 A * | 3/2000 | Ramanathan et al. | ........ | 370/241 |
| 6,052,718 A | 4/2000 | Gifford | ......................... | 709/219 |
| 6,078,943 A * | 6/2000 | Yu | ................................. | 718/105 |
| 6,078,960 A | 6/2000 | Ballard | | |
| 6,081,840 A * | 6/2000 | Zhao | ............................. | 709/224 |
| 6,092,178 A * | 7/2000 | Jindal et al. | ..................... | 712/27 |
| 6,108,703 A | 8/2000 | Leighton et al. | | |
| 6,134,588 A | 10/2000 | Guenthner et al. | | |
| 6,173,322 B1 | 1/2001 | Hu | | |
| 6,185,598 B1 * | 2/2001 | Farber et al. | ................... | 709/200 |
| 6,185,619 B1 * | 2/2001 | Joffe et al. | .................... | 709/229 |
| 6,249,800 B1 | 6/2001 | Aman et al. | | |
| 6,249,801 B1 | 6/2001 | Zisapel et al. | | |
| 6,256,675 B1 * | 7/2001 | Rabinovich | .................... | 709/241 |
| 6,298,451 B1 | 10/2001 | Lin | | |
| 6,304,913 B1 * | 10/2001 | Rune | .............................. | 709/241 |
| 6,324,580 B1 * | 11/2001 | Jindal et al. | ................... | 709/228 |
| 6,338,092 B1 * | 1/2002 | Chao et al. | ..................... | 709/236 |
| 6,345,294 B1 | 2/2002 | O'Toole et al. | ............... | 709/222 |
| 6,389,448 B1 | 5/2002 | Primak et al. | | |
| 6,430,618 B1 | 8/2002 | Karger et al. | | |
| 6,449,647 B1 | 9/2002 | Colby et al. | | |
| 6,502,125 B1 * | 12/2002 | Kenner et al. | ................. | 709/203 |
| 6,505,254 B1 * | 1/2003 | Johnson et al. | ............... | 709/239 |

(Continued)

FOREIGN PATENT DOCUMENTS

WO  WO99/40514  12/1999

OTHER PUBLICATIONS

Rabinovich, "Issues in Web Content Replication", 1998, IEEE.*

(Continued)

*Primary Examiner* — Patrice Winder
*Assistant Examiner* — Julian Chang

(57) ABSTRACT

Content servers are directed to send messages to network nodes which are used to obtain IP addresses and to receive responses from the network nodes. The responses provide network service information. The content servers collect data based on the responses and feed the data to a routing server. Based on the data fed to the routing server, respective choices of content servers are selected and provided to the network nodes to respond to clients requesting content server addresses from the network nodes.

68 Claims, 8 Drawing Sheets

(56) References Cited

U.S. PATENT DOCUMENTS

| | | | |
|---|---|---|---|
| 6,539,426 B1 | 3/2003 | Meek et al. | |
| 6,553,413 B1 | 4/2003 | Leighton et al. | |
| 6,553,420 B1 | 4/2003 | Karger et al. | |
| 6,571,288 B1 | 5/2003 | Sarukkai | |
| 6,578,066 B1 | 6/2003 | Logan et al. | |
| 6,581,065 B1* | 6/2003 | Rodkin et al. | 707/102 |
| 6,795,858 B1 | 9/2004 | Jain et al. | |
| 6,871,210 B1 | 3/2005 | Subramanian | |
| 6,928,481 B1 | 8/2005 | Harris et al. | |
| 6,950,849 B1 | 9/2005 | Brandstätter | |
| 6,959,333 B2* | 10/2005 | Beaumont et al. | 709/223 |
| 6,963,914 B1 | 11/2005 | Breitbart et al. | |
| 6,970,932 B1 | 11/2005 | Juster | |
| 6,981,029 B1 | 12/2005 | Menditto et al. | |
| 7,003,581 B1 | 2/2006 | Lamberton et al. | |
| 7,020,698 B2* | 3/2006 | Andrews et al. | 709/223 |
| 7,027,773 B1 | 4/2006 | McMillin | |
| 7,032,010 B1 | 4/2006 | Swildens et al. | |
| 7,058,706 B1* | 6/2006 | Iyer et al. | 709/223 |
| 7,086,061 B1 | 8/2006 | Joshi et al. | |
| 7,111,061 B2* | 9/2006 | Leighton et al. | 709/224 |
| 2001/0039585 A1 | 11/2001 | Primak et al. | |
| 2001/0049741 A1 | 12/2001 | Skene et al. | |
| 2002/0038360 A1* | 3/2002 | Andrews et al. | 709/223 |
| 2002/0065938 A1* | 5/2002 | Jungck et al. | 709/246 |
| 2002/0116525 A1 | 8/2002 | Peters et al. | |
| 2002/0186694 A1* | 12/2002 | Mahajan et al. | 370/390 |
| 2003/0041094 A1* | 2/2003 | Lara et al. | 709/201 |
| 2003/0177162 A1 | 9/2003 | Staiger et al. | |

OTHER PUBLICATIONS

Yu, et al, "Dynamic Load Balancing on Web-Server Systems", 1999, IEEE Internet Computing, May-Jun. 1999, pp. 28-39.*

Amir, Yair et al., "Seamlessly Selecting the Best Copy from Internet-Wide Replicated Web Servers" *The 12th International Symposium on Distributed Computing,* (DISC'98), pp. 22-33, Sep. 1998.

Amir and Shaw, "WALRUS- a Low Latency, High Throughput Web Service Using Internet-wide Replication," In Proceedings of the 19th IEEE Workshop on Electronic Commerce and Web-Based Applications, pp. 31-40, Austin, May 1999, http://www.cnds.jhu.edu/publications/ May 16, 2002.

Bakker, A. et al., "The Globe Distribution Network," *Proc. 2000 USENIX Annual Conf. (FREENIX Track),* San Diego, pp. 141-152, Jun. 18-23, 2000, http://www.cs.vu.nl/globe/publications.html May 16, 2002.

Carter, R.L. and Crovella, M.E., "Dynamic Server Selection using Bandwidth Probing in Wide-Area Networks," BU-CS-96-007, Mar. 18, 1996, http://citeseer.nj.nec.com/carter96dynamic.html May 16, 2002.

Francis, Paul. "VOID: Extending the Internet Multicast Architecture," [online] http://www.icir.org/void/docs/ycHtmlL/htmlRoot.html May 21, 2002.

Guyton, James D. and Schwartz, Michael F., "Locating Nearby Copies of Replicated Internet Servers" *Computer Communications Review 25 (4):* 288-98 (1995).

Karger, D.R. et al., "Consistent Hashing and Random Trees: Distributed Caching Protocols for Relieving Hot Spots on the World wide Web" *Proc. 29th ACM Symposium on Theory of Computing,* pp. 654-662, May 1997.

Leach, Paul J., "Selecting a server from among many replicas," Internet Draft, [online] ASID working group, Feb. 23, 1997, http://www.watersprings.org/pub/id/draft-ietf-asid-replica-selection-00.txt May 21, 2002.

Sayal, M., et al. Selection Algorithms for Replicated Web Servers, [online] http://www.cs.wisc.edu/~cao/WISP98/html-versions/mehmet/SelectWeb1.html May 16, 2002.

U.S. Appl. No. 09/294,837, filed Apr. 19, 1999, Now U.S. Pat. No. 6,505,254 issued Jan. 7, 2003, entitled Methods and Apparatus for Routing Requests in a Network.

U.S. Appl. No. 09/642,143, by Day et al. filed Aug. 18, 2000.

U.S. Appl. No. 09/824,553, by Kirk Johnson, et al., filed Apr. 2, 2001.

U.S. Appl. No. 09/535,279, by Gang Lu et al., filed Mar. 24, 2000.

U.S. Appl. No. 09/824,527, by Kirk Johnson, filed Apr. 2, 2001.

Overview of the Cisco DistributedDirector 4700-M, http://www.cisco.com/univercd/cc/td/doc/product/iaabu/distrdir/dd4700m/overview.htm, accessed Jun. 12, 2004.

* cited by examiner

TABLE OF CANDIDATE CONTENT SERVER RECORDS ~300

| 305a | 305b | 305c | ... | 305n |
|---|---|---|---|---|
| CS1 | CS2 | CS3 | ... | CSn |
| WEIGHT, CONTENT | WEIGHT, CONTENT | WEIGHT, CONTENT | ... | WEIGHT, CONTENT |

| PROXY TABLE, 800 (FOR PROXY GROUP 720a, FIG. 7) | | COMPLETE |
|---|---|---|
| LOCATION | DISTANCE FROM PROXY | NUM. PROBES |
| LOCATION 730a | d1 | 5 |
| LOCATION 730b | d2 | 3 |
| LOCATION 730c | d3 | 7 |
| LOCATION 730d | d4 | 6 |
| ⋮ | ⋮ | ⋮ |
| LOCATION 730n | dn | 1 |

FIG. 8

CONTENT SERVER SELECTION FOR ACCESSING CONTENT IN A CONTENT DISTRIBUTION NETWORK

RELATED APPLICATIONS

This application is related to the following applications: U.S. application Ser. No. 08/779,770 filed Jan. 7, 1997 entitled "Replica Routing;" U.S. application Ser. No. 09/294,836 filed Apr. 19, 1999 entitled "Self-Organizing Distributed Appliances;" U.S. application Ser. No. 09/294,837 filed Apr. 19, 1999 entitled "Replica Routing;" U.S. Provisional Application No. 60/160,535 filed Oct. 20, 1999 entitled "Automatic Network Address Assignment and Translation Inference;" U.S. Provisional Application No. 60/177,415 filed Jan. 21, 2000 entitled "Method and Apparatus for a Minimalist Approach to Implementing Server Selection;" U.S. Provisional Application No. 60/178,062 filed Jan. 24, 2000 entitled "Method and Apparatus for Determining a Network Topology in the presence of Network Translation;" U.S. Provisional Application No. 60/178,063 filed Jan. 24, 2000 entitled "Method and Apparatus for Automatic Network Address Assignment;" U.S. Provisional Application No. 60/177,985 filed Jan. 25, 2000 entitled "Fast-Changing Network Status and Load Monitoring and Feedback;" U.S. Non-Provisional patent application having U.S. application Ser. No. 09/535,279 filed Mar. 24, 2000 entitled "Method and Apparatus for Automatic Network Address Assignment;" and U.S. patent application having U.S. application Ser. No. 09/642,143 filed Aug. 18, 2000 entitled "Remote Identification of Client and DNS Proxy IP Addresses". The entire teachings of the above applications are incorporated herein by reference.

BACKGROUND OF THE INVENTION

The recent rapid growth of the World Wide Web and international computer networks such as the Internet has created a large demand for the content contained at server machines within the network. This has led to the development of content distribution networks (CDNs). CDNs allow content from the servers to be cached at many machines located at various locations in the internet. There may be many thousands of these content server machines, and they may be widely distributed, e.g., located in all continents.

Storing a server's content at many, geographically-distributed content servers within a CDN can vastly reduce the load at the server machine, since user requests can be handled at the content servers. Additionally, users can receive better service if they can receive desired content from a content server that is "good" for them, where good means nearby, inexpensive to communicate with, on-line, uncongested, etc. However, these benefits are possible only if there is a way of directing client requests to good content servers. Furthermore, replication may be controlled so that content from a particular server is allowed to be cached at only a subset of the content servers. Therefore, the content server selection problem has another dimension: choosing good content servers that can also serve the requested content.

SUMMARY OF THE INVENTION

The invention provides a network content server selection system with a new method to automatically direct a client computer that requests content to a content server that can serve the requested content. The selected content server is one that will perform well for that client: it is nearby, relatively inexpensive for that client to communicate with, on-line, uncongested, etc.

In the Internet, content is located through the use of DNS (Domain Name System), which provides translations of DNS names to IP (Internet Protocol) addresses. A DNS name identifies the server of interest in a user-friendly way (e.g., "www-.pictures.merlot.cisco.com"); the IP address returned by DNS is a low-level name used within the network to identify a machine. The invention works within DNS to control this mapping, so that the IP addresses that are selected correspond to content servers that are close to the requesting client and that can serve the requested content. More specifically, the DNS name identifies a provider of content, such as a web site, whose content can be replicated at content servers within a content distribution network (CDN). The invention enables the content server selection system to provide the client with the IP address of one of the content servers within the CDN that is a good one for that client to use to access the requested content.

Client machines interact with DNS via a DNS proxy. The proxy might run on the client machine, or on a different machine. If the proxy does not know how to translate the DNS name provided by the client, it consults other DNS servers in the Internet. Normal DNS mechanisms will ultimately lead the proxy to communicate with one of the selection servers in the CDN system. That selection server then chooses content servers that are good for that client request. The selection server is referred to as a "replica router" or "routing server" because it routes the client request to one of the content servers within the CDN.

The invention allows the routing subsystem to base its selections on a map of the Internet. The routing subsystem maintains tables that store this map. The tables contain information about the "distances" between content servers and DNS proxies, where "distance" can mean the time taken for content servers to communicate with the proxies, or other kinds of network measurements. The selection decisions at the routing servers are made using the information in the tables.

The information in the tables can be based both on information that is entered into the system, and on information that is collected dynamically. In one embodiment, the dynamic information is collected via a protocol that is carried out between the routing servers and the content servers. The routing servers instruct the content servers to collect information about their "distance" from particular DNS proxies. The content servers collect the information as instructed and report it back to the routing servers, which use it to update the tables. The updated tables are then used in subsequent selections. The routing servers control what the content servers do to collect the information, including controlling what proxies they communicate with and when these communications occur. In this way the invention is able to keep the load on the network and the proxies due to the collection of dynamic network information very small.

The present invention provides the following benefits for a network, such as a CDN:

(1) Adjustments to changing conditions in the CDN are automatic. For example, the following changes in the CDN are automatically accomodated: the addition or removal of caches; the addition or removal of content that should be served in the CDN; changes in the assignment of content to particular content servers; changes in the topology of the Internet; and changes in the load and status of the content servers.

(2) Externally-provided information can be incorporated to prime and improve construction of content server tables.
(3) The technique employed for collecting information about network topology makes use of background activity that has little impact on the performance of the routing servers or the caches.
(4) A variety of general metrics can be employed to determine what content servers are good for particular clients.
(5) The present invention is scalable from small networks to very large networks (e.g., tens of thousands of caches, millions of DNS proxies). A number of techniques are included that keep both the amount of communication and the amount of stored information under control, even in very large configurations.
(6) The present invention is able to tolerate faults of the routing servers and the content servers, and also of the communication between them.
(7) There is no change required to the existing code base at client machines, DNS servers, or servers of the content being cached in the CDN, which is important since the number of these machines is can be large (i.e., millions or billions).

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 is a table of content server-information records maintained in the routing server of FIG. 1;

FIG. 8 is a table maintained in the routing server that stores information about a proxy group in the network of FIG. 7.

DETAILED DESCRIPTION OF THE INVENTION

Figure 1:
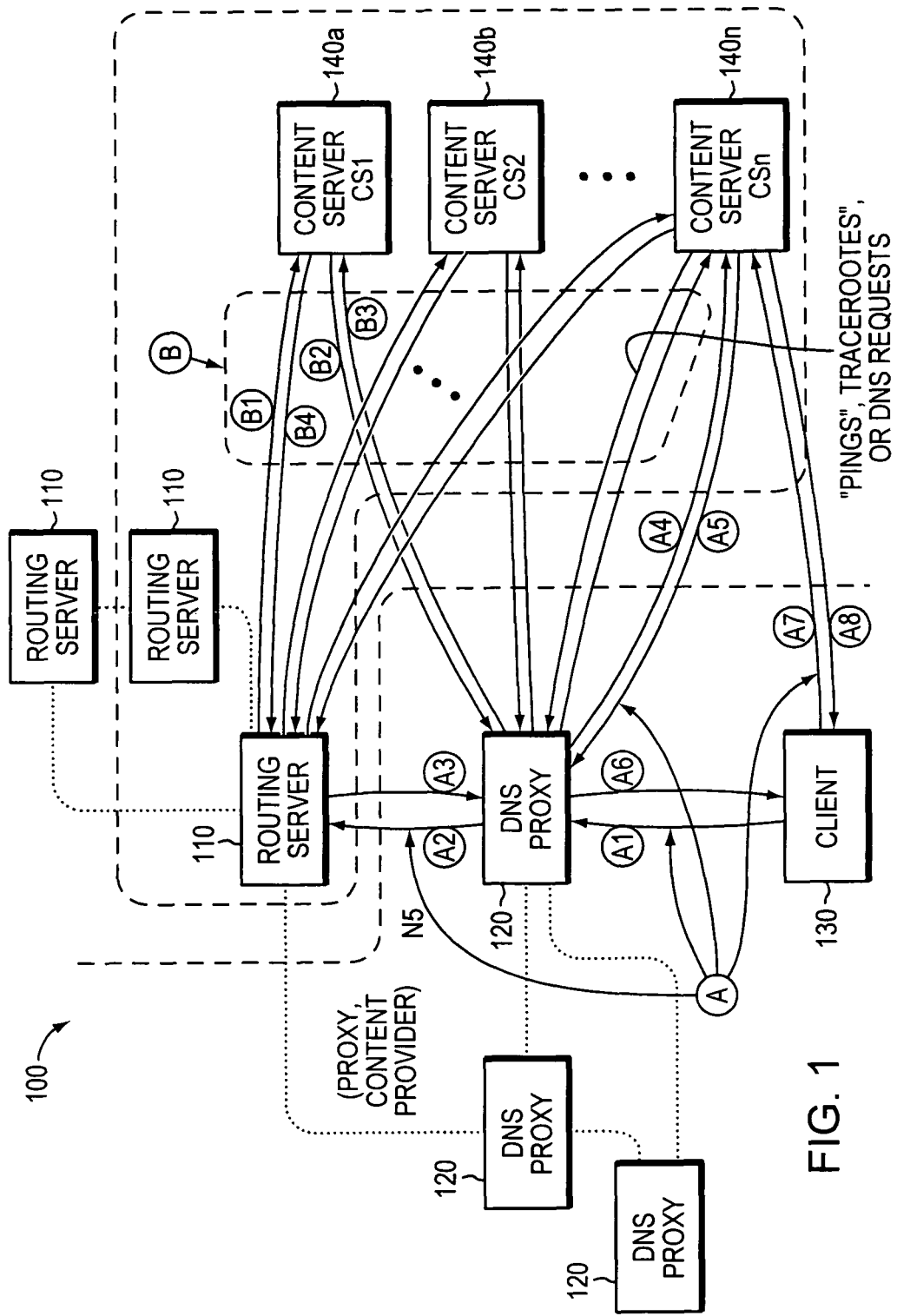
FIG. 1 is a block diagram of a portion of a network in which various aspects and embodiments of the present invention may be deployed.

Before discussing details of the preferred embodiments, a brief overview is presented. In a typical networking scenario, a routing subsystem of a CDN is presented with a request to translate a DNS name from a DNS (Domain Name System) proxy. The DNS name identifies a "routed domain" (RD): some content that is being replicated in the CDN. The DNS proxy might be one that the routing subsystem has dealt with before, or the DNS proxy might be new to the routing subsystem. In either case, it is desirable in large networks, such as the Internet, to route the DNS proxy to a content server that is reasonably close to the DNS proxy. More specifically, the system attempts to achieve the following goals:

1. For a known DNS proxy, the routing server selects a content server that is really good for the DNS proxy, e.g., in the top 10% of possible choices for that proxy and the requested routed domain.

2. For an unknown DNS proxy, the routing server makes a good selection (i.e., avoids making a bad selection).

In either case, only content servers that can cache the requested routed domain are selected. When asked to make a selection, a routing server makes use of tables that rank the "goodness" of content servers relative to the proxy requesting the access. For known DNS proxies, the tables contain information about the distances from content servers to the DNS proxy. For unknown DNS proxies, the routing server maintains a special table in which distance is approximated by a notion of "desirability" of various content servers. As explained later, tables may relate information to groups of proxies rather than individual proxies, to reduce table size.

In either case, content servers that are better for the DNS proxy (according to the table) are selected. Furthermore, the routing server selects only content servers that serve the requested RD and that are on-line; additionally it attempts to select content servers that are not overloaded.

The information used to build the tables for known DNS proxies is collected by the system in the background. This information is obtained by having the routing servers ask content servers to communicate with DNS proxies to determine their "distance" from the DNS proxies. This activity is called "probing". As discussed later, only a subset of content servers, called "leaders", may be asked to do probing. The information gathered by the content servers is sent back to the routing servers, where it is integrated into the tables. The tables are then sorted by increasing distance, or other suitable metric, so that the closest content server appears first in the table. As discussed later, the information in the table may relate to groups of content servers rather than individual content servers.

The routing server returns a set of selections to the DNS proxy making a request. These choices are sent as NS (Name System) records. Each record has an associated time-to-live (TTL). Different TTLs are used in different responses to the DNS proxies. The routing server uses a short TTL (e.g., 6 minutes) when it is uncertain about its choices; a short TTL causes the DNS proxy to get new information from the routing server in the near future, by which time the routing server will have more information and by which time the choices the routing server makes are expected to be better than the previous choices. The routing server uses a longer TTL (e.g., 30 minutes) when it is more certain about its choices.

The routing server can also vary the number of selections it returns to the DNS proxy. For example, the routing server uses a small number (e.g., 3) when it is confident about its choices and a larger number (e.g., 8) when it is not.

Sending NS records causes the DNS proxy to communicate with one of the selected content servers. The contacted content server will reply with an actual IP address in an "A" (address) record; this IP address may be its own address, or the address of a nearby content server that stores the requested routed domain. When the proxy receives a response from the contacted content server, it will return the IP address provided by that content server to the requesting client; if it receives no response, it will try another content server (one listed in one of the other NS records). The contacted content server typically gives the A record it returns a very short TTL (e.g., 15 seconds). This short TTL causes the DNS proxy to discard the A record quickly, causing the DNS proxy to re-contact the content server after expiration of the A record, thereby contributing to the robustness of the process envisioned by the principles of the present invention.

If the proxy receives subsequent requests for the same DNS name before the TTL of the NS records expires, it will continue to contact the content servers identified in the NS records it already received. Returning several NS records to the proxy provides additional fault tolerance (since the proxy won't select a content server that does not reply), load balancing (since if several content servers are equally "close" to the proxy it will cycle through them), and an additional chance to order the content servers (since the proxy will prefer content servers that respond more quickly to those that respond less quickly).

The routing server typically collects information periodically. A data collection period, D, preferably should be smaller than the short NS record TTL. Ideally, the TTL >=3D since this ensures there will be better information when the DNS proxy goes back to the routing server. Thus, for a short TTL of 6 minutes, the routing server might use a collection period of 2 minutes.

The data collection preferably involves communication between content server leaders and all routing servers in each period. Communication with each content server leader means that each routing server learns all new information in each period, even information that was requested by a different routing server. The communication is unsynchronized, however, and there is no guarantee that each routing server receives exactly the same messages. Therefore, the tables at the routing servers might diverge, though not greatly.

A detailed description of the preferred embodiments follows.

FIG. 1 is a block diagram of a network comprising a subset of a content delivery network 100 employing a DNS (Domain Name System) protocol. The network comprises a client 130, DNS proxy 120, routing server 110, and content servers 140a, 140b, . . . , 140n (collectively 140). The client 130 is commonly referred to as an end user 130 (e.g., browser). As will be discussed later, content servers 140 may be grouped together to reduce communication and storage requirements. Further, a plurality of routing servers 110, in a distributed architecture in one embodiment, may share data consistent with the principles of the present invention. Both the routing servers 140 and content servers 110 may be any computing device capable of executing respective processes described herein.

The client 130 needs to resolve a URL (Uniform Resource Locator) to access, for example, a webpage. Resolving a URL involves a first step: the DNS name, which is the first part of the URL, must be mapped to an IP address of some computer in the network. If the DNS name in the URL already has a local mapping to some IP address, the client 130 uses the local mapping. Otherwise, the client 130 sends a message to the DNS proxy 120, asking the DNS proxy 120 to resolve the DNS name.

If the DNS proxy 120 knows some A records for the DNS name, the DNS proxy 120 returns the IP addresses contained in the A records to the end user. If the DNS proxy 120 does not know any A records, but it knows some NS records for the DNS name, the DNS proxy 120 probes a node identified by one of the NS records. The NS records identify content servers 140 and therefore the probe goes to one of the content servers 140.

If the probe succeeds, the probed content server 140 returns an A record containing a single IP address of a content server 140; the IP address corresponds to either the probed content server 140 or the address of a nearby content server that serves the requested RD. This IP address is then returned by the DNS proxy 120 to the end user 130. If the probe does not receive a reply, the DNS proxy tries a content server listed in one of the other NS records.

The DNS proxy 120 obeys TTL (time-to-live) parameters. The DNS proxy 120 discards A records or NS records based on the TTL parameters the respective records contain. There can be different TTL parameters associated with the different records. In one embodiment, a very short TTL parameter is used for the A records and much longer ones are used for NS records.

If the DNS proxy 120 does not know anything about the DNS name, it communicates with the other DNS servers (not shown). This leads the DNS proxy 120 to communicate with one of the routing servers 110. This communication might be "direct", i.e., the DNS proxy 120 already knows how to get in touch with a routing server 140, or the DNS proxy 120 may need to talk to other DNS servers 120 first.

The message sent from the DNS proxy 120 to a given routing server 110 results in a reply from the given routing server 110 to the DNS proxy 120 that contains at least one NS record. If the given routing server 110 does not answer the DNS proxy 120, the DNS proxy 120 tries a different routing server 110.

Apart from the interaction between the DNS proxy 120 and the routing servers 110, the routing server 110 directs the content servers 140, or subsets of content servers 140 (i.e., content server "leaders"), to probe the DNS proxy 120. The content servers 140 collect data based on these probes and send (i.e., feed back) the data they collect to the routing server 110, on a periodic basis in one embodiment. The routing server 110 orders the content servers 140—or records corresponding to the content servers 140 organized in a table— corresponding to a metric, such as distance, network hops, or congestion factor, as determined by analyzing the data received from the content servers 140. The routing server 110 uses the ordering to make decisions for future content server 140 selection activities when requested by the DNS proxy 120.

The routing server 110 provides names of the selected content servers 140 to the DNS proxy 120 via NS (name server) records. More than one NS record is provided in case some very recent problems arose that make one of the good content servers choices a bad choice. Typically, two or three alternative content servers are sufficient, but more can be provided to ensure success. In this way, the content servers 140 determined to be good content servers 140 by the process are, in turn, selected by the DNS proxy 120 for the requesting client 130.

A set of process steps corresponding to the process of determining optimum content servers 140 is enumerated along the links between network nodes in FIG. 1. In a set of "A" links, the client 130, DNS proxy 120, routing server 110, and content servers 140 exchange information, with a set of content servers 140 being returned from the routing server 110 to the DNS proxy 120 in accordance with the principles of the present invention. In a set of "B" links, the routing server 110, content servers 140, and DNS proxy 120 exchange information that is used to ascertain good content servers 140.

Referring to the DNS protocol steps of the "A" links, in step A1, the client requests an IP address of a DNS name from the DNS proxy. Assuming the DNS proxy does not presently know the IP address corresponding to the DNS name, in step A2, the DNS proxy requests resolution of the DNS name from an authoritative name server, which is a routing server 110. The routing server 110 has an interrupt service routine, or other mechanism, to select content servers 140 upon request. The content servers 140 selected are able to provide content requested by the client.

Figure 2:
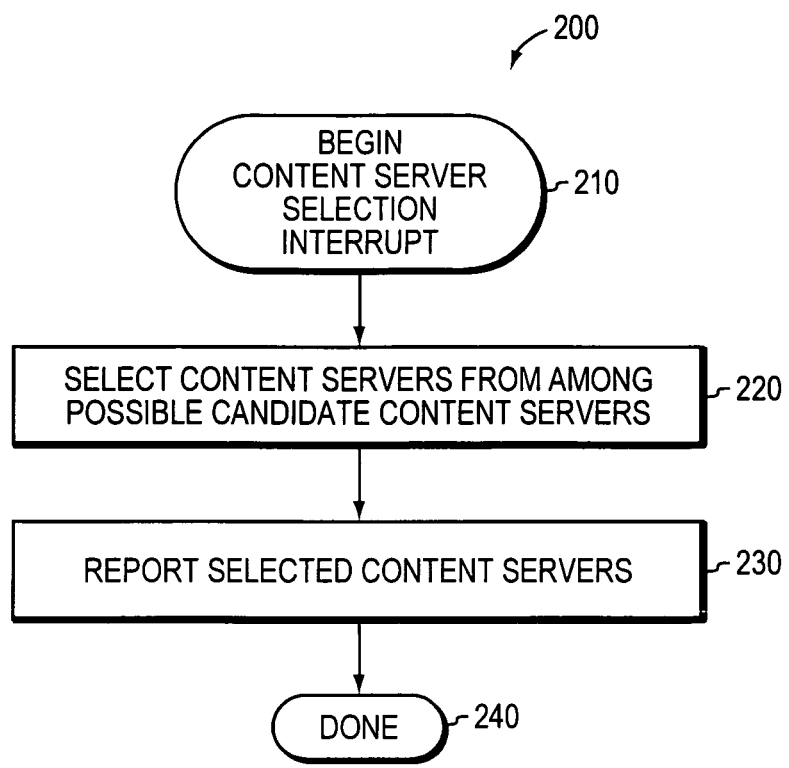
FIG. 2 is a flow diagram of a content server selection interrupt routine operating in a routing server in the network of FIG. 1.

FIG. 2 is a flow diagram of an embodiment of an interrupt service routine 200 in which the routing server 110 selects content servers 140 from among a set of possible content servers 140. The interrupt service routine begins in step 210. In step 220, content servers 140 are chosen from among possible content servers 140. Information about content servers 140 may be maintained in many different forms, one of which is a table of records and is the subject of FIG. 3.

FIG. 3 is a table of content server records 300. The information in the table cells 305a, 305b, . . . , 305n (collectively 305) corresponding to the content servers 140 include weights and content information, where the weights may simply be distance information indicating a distance from a given DNS proxy 120 of the content server 140. Alternatively, the weights may be calculated based on a number of factors, such as manually entered information, proxy or content server IP address information, peer relationships, geography, or metrics in the data fed back to the routing server 110. The table cells 305 are not limited or restricted from including other information regarding content servers 140, network connectivity to content servers 140, service quality metrics, or other service-related information. Other service-related information may include at least one of: response times, load, status, or filtered data corresponding to the network nodes.

Because the number of DNS proxies 120 can range into the millions, a preferred embodiment tracks information for groups of proxies rather than individual proxies. In one embodiment, proxies 120 are grouped geographically. An alternative embodiment groups proxies by their IP addresses; proxies whose IP addresses are very close (e.g., agree in the most significant 25 or 26 bits) are considered to be a group. In yet another embodiment, proxies are grouped using other information, optionally including tables that are entered into the system or information gleaned from routers on the Internet. Additionally, grouping proxies 120 by autonomous systems (AS) is another reasonable approach at organization. It should be understood that a combination of the approaches described may also be employed according to the principles of the present invention.

Also, because the number of content servers 140 known to the routing server 110 may range into the thousands, a preferred embodiment tracks "locations" rather than content servers. All content servers 140 in a location are geographically close to one another. In one embodiment, this information about content server locations is entered by a person; in alternative embodiments, the information can be collected dynamically by having content servers exchange messages with one another. In the preferred embodiment, the content information is also maintained for locations: a location contains an RD if any content server 140 in the location can cache that RD.

Additionally, the table 300 may be organized in many ways. In one embodiment there is a separate table per proxy group, and the information about what locations store what content is kept separately.

A further point is that the selection process can be done in a number of ways. In one embodiment, a table for a particular proxy or proxy group is sorted so that the best location, as determined by a metric based on the data collected by the corresponding content server's probing of the DNS proxy 120, further discussed below in relation to the "B" links, appears first in the table (i.e., table cell 305a is the best, table cell 305b is the second best, and so on); in this case the closest content servers that contain the requested content, are selected.

In another embodiment, the table is organized to separate a set of "best content servers" for that proxy from other content servers. The "best" content servers may be determined numerically (e.g., top 10%), or by a calculation that compares the metric for top-ranked content servers with that of other content servers and ranks those whose metric is worse than that of the top-ranked content servers by some amount as not being in the best group. However, because the content servers 140 in the set of best content servers may not necessarily be able to provide the client-requested content, the table of content server records 300 keeps track of content servers 140 in the set of other content servers, expecting that at least one content server 140 in the set of other content servers can provide the client-requested content. In this embodiment, a random or pseudo-random selection process may be employed to select content servers from among the set of best content servers (FIG. 3). Furthermore, the set of best content servers may be stored in operational memory while the set of other content servers may be stored in other forms of memory, such as a local or remote read/write magnetic or optical storage medium. This organization allows the most important information to be kept in operational memory (e.g., high speed RAM or cache) when operational memory is limited within the routing server 110.

A final point about selection is that the selection step can prefer to use content servers that are not overloaded. However, the selection can be tuned to choose an overloaded content server that is very close to the DNS proxy 120 that made the request over one that is far away but unloaded.

Referring again to FIG. 2, in step 230, the content servers selected, typically the content servers 140 corresponding to the content server records having the lowest weights and supporting requested content (FIG. 3), are reported by the routing server 110 to the DNS proxy 120. In step 240, the content server selection interrupt routine 200 is done, allowing the routing server 110 to perform other functions, including repeating the content server selection interrupt routine 200 for other requests. It should be understood that the routing server 110 may have multiple processors or be a plurality of routing servers 110 for performing multiple content server selection tasks in parallel or in a distributed manner.

Referring back to FIG. 1, in step A3, the routing server 110 returns a vector of candidate content servers (i.e., the selected content servers), which includes time-to-live parameters that are the same for each of or specific to the candidate content servers. The values of the time-to-live parameters are optionally a function of the data collected by the content servers 140 in performing the "B" process steps, discussed below. In step A4, the DNS proxy probes one of the content servers 140 listed in the vector of candidate content servers returned by the routing server 110. In step A5, the probed candidate content server 140 responds to the probe. In step A6, the DNS proxy returns the content server's IP address (i.e., A record) to the client. In step A7, the client 130 contacts the selected content server for requested content. Finally, in step A8, the client 130 receives the requested content.

The vector of candidate content servers returned in step A3 from the routing server 110 to the DNS proxy 120 contains a select group of content servers determined by the "B" process. The "B" process comprises a portion executed by a processor—or even a separate machine—in the routing server 110 and a portion executed by distributed nodes (i.e., the content servers 140). The portion executed by the routing server 110 is depicted in FIG. 4.

Figure 4:
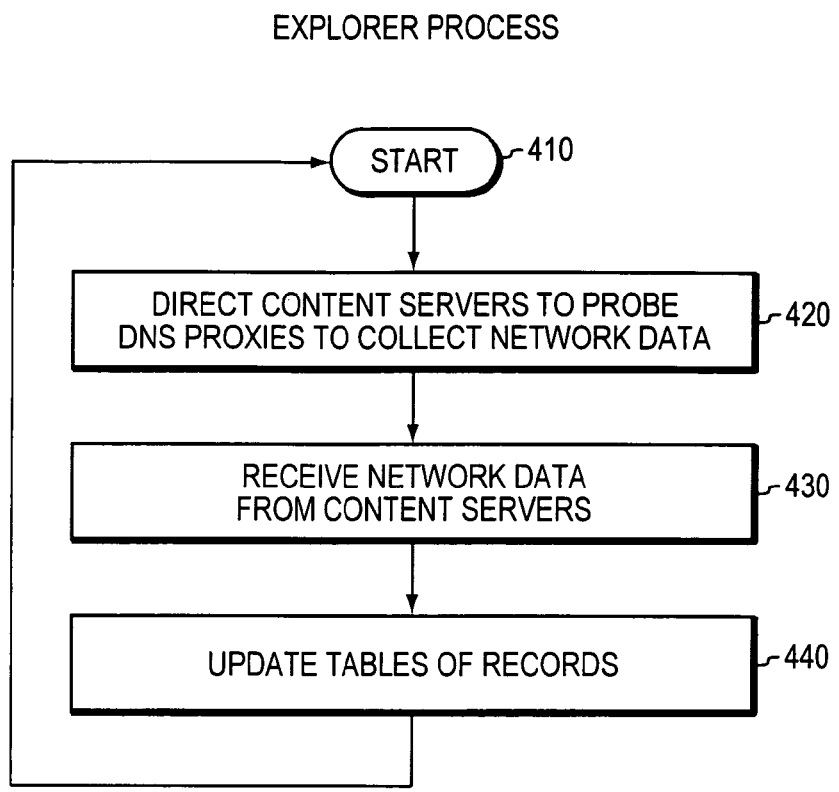
FIG. 4 is a flow diagram of a process executed by a routing server for working with content servers in the network of FIG. 1.

Referring to FIG. 4, the process of updating the information in the table of content server records 300 (FIG. 3) begins in the routing server 110 in step 410. In step 420 (FIG. 1, step B1), the routing server 110 directs certain content servers 140 to probe at least one DNS proxy 120. Typically, the routing server 110 knows which DNS proxy 120 is located near which content servers 140—either from being told or as a result of previous probes, but may direct several content servers to probe particular DNS proxies to determine location or least response-time relationships. For robustness and adapting to a dynamically changing network, the list of DNS proxies preferably includes a mix of DNS proxies: (i) some DNS proxies the routing server 110 thinks or knows are located near the respective content servers 140, and (ii) some other DNS proxies in case the network has changed (e.g., a new backbone has been added). In one embodiment, the routing server 110 will prefer to direct content servers to do probes to "new" DNS proxies (ones in groups it has not heard from before), and after that it will prefer to direct probes to "active" proxies (ones that have communicated with it recently).

The directions optionally include instructions to have the content servers 140 probe the DNS proxies in a controlled manner so that the DNS proxies 120 do not become congested by servicing the content server probes. For instance, the content servers 140 may be (i) "scheduled" to probe the DNS proxies at respective times so one or few content servers are probing the DNS proxies at a time, or (ii) restricted from probing more than an allotted number of times per time interval. In the preferred embodiment, only one content server per location (the "leader" of that location) is asked to do the probes by the routing server 110; the leader does the probes for the other content servers located in the same general area. Additionally, the routing server will direct probes to only one DNS proxy within a group of proxies that are located near one another.

Figure 5:
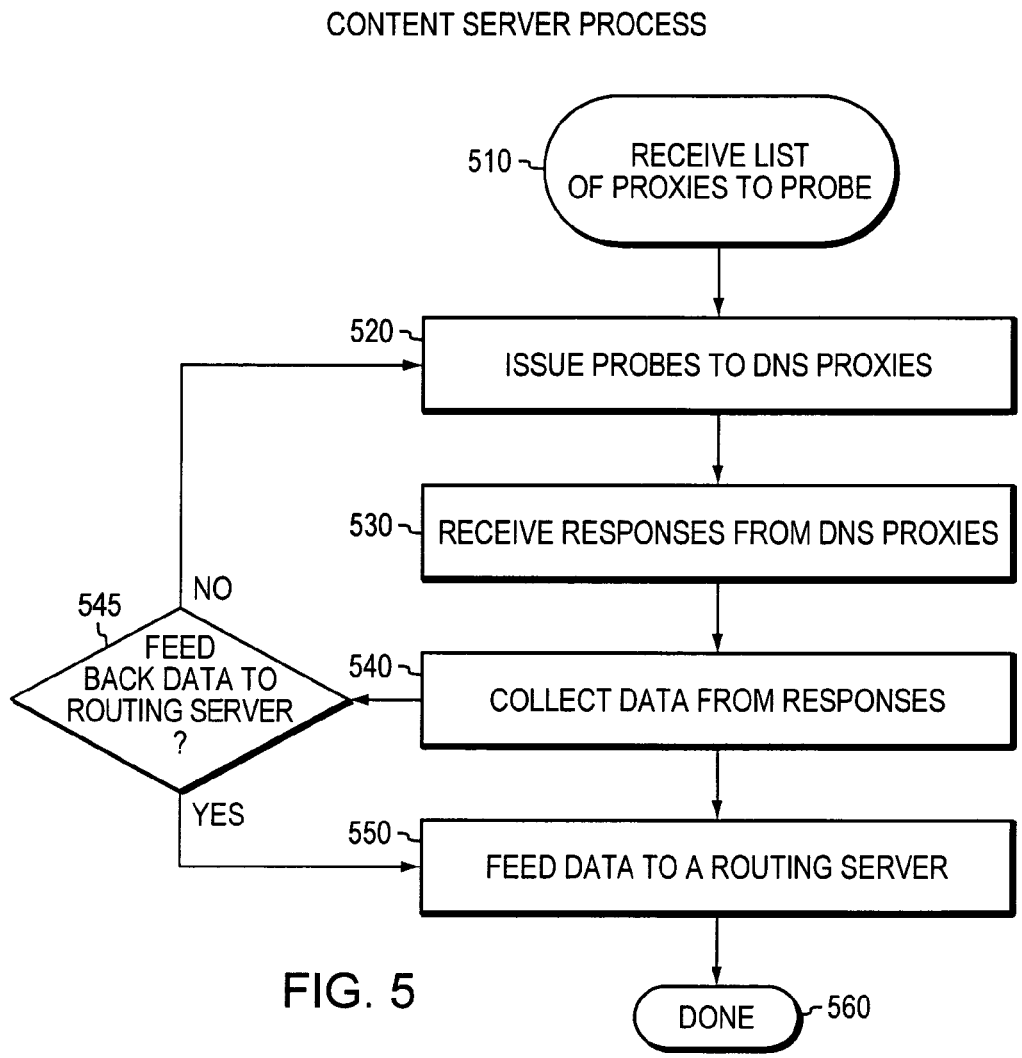
FIG. 5 is a flow diagram of a process executed by a content server of FIG. 1.

The process for executing the probes to the DNS proxies and receiving responses from the DNS proxies is the subject of the flow diagram of FIG. 5. In step 510, a content server 140 receives a list of DNS proxies to probe from the routing server 110, or other network node designated to begin the probing process. Typically, a content server 140 receives lists from all routing servers 510 and combines the requests before it starts probing. Furthermore, a content server 140 may filter the combined list to reduce its workload or to reduce the number of probes being sent to particular DNS proxies 120. To aid in this filtering, the routing servers 110 may indicate which probes are to unknown proxies and which are to active proxies. A content server 140 may additionally use information about what it did in earlier periods to control its probes.

In step 520, the content server issues probes to the DNS proxies. The probes (i) may be as simple as "ping" or "traceroute" messages to determine distances or response times between the respective DNS proxies and content servers, (ii) may be DNS requests to the DNS proxy, (iii) may be requests that gather information about the routes between the content servers 140 and the DNS proxies 120, or (iv) a combination of these. Further, typically more than one probe is made from a content server 140 to each DNS proxy 120.

In step 530, the content server 140 receives responses from the probes. The responses to the probes may comprise data, such as a distance metric, DNS proxy response time, or even operational status of the communication link between the content servers 140 and DNS proxies 120. In step 540, the data computed by the content server 140 or contained in the responses or attached to the responses in header fields is collected by the content servers. Alternatively, a content server 140 may not collect the data per se, but instead forward the data directly to the routing server 110. In an embodiment in which the data are collected temporarily by the content servers 140, the data may be averaged, accumulated, or kept as raw data, depending upon the direction given to the content servers 140 by the routing server 110 in step 420 (FIG. 4). Alternatively, other mathematical methods may be employed by the content servers 140 to pre-calculate data for the routing server 110.

The probing process next executes a query 545 to determine whether the process should feed the data back to the routing server 110. The decision to feed the data back may be dependent on an absolute time, relative time, or number of probes and responses issued and received, respectively, by the content server executing the process. If the answer to the query 545 is "no", then the process returns to step 520 for further probing of DNS proxies. If the answer to the query 545 is "yes", then the process continues to step 550 (FIG. 1, step B4) to feed the data to the routing server 110. A lack of data feedback (typically for several periods) by a content server may be viewed by the routing server 110 as an indication of a non-operational status of the content server. Timing requirements may be imposed on the content servers 140 for returning data to the routing server 110 to determine content server operational status.

In step 560, the process ends and waits for another list from the routing server 110 of DNS proxies to probe. In addition, the new list might be augmented locally, based on what happened in the past (e.g., in previous periods). Alternatively, the process may loop, feeding data to the routing server 110 periodically or when requested.

Referring again to FIG. 4, in step 430, the routing server 110 receives data determined by the probing of the DNS proxy 120 from the content servers 140. Based on the data, the routing server 110 updates the table of records 300 (FIG. 3) in step 440. The process of directing the content servers 140 to probe the DNS proxies 120 and receiving data from the content servers 140 resulting from the probes continues periodically or occasionally to ensure that the dynamic nature of a network, such as the Internet, or a content delivery subsystem existing and/or growing thereon, is accurately reflected in the content servers returned to the DNS proxies by the routing server 110.

The following discussion provides detailed embodiments of various components described above. Before describing the components, a summary review of the process is provided.

Figure 6:
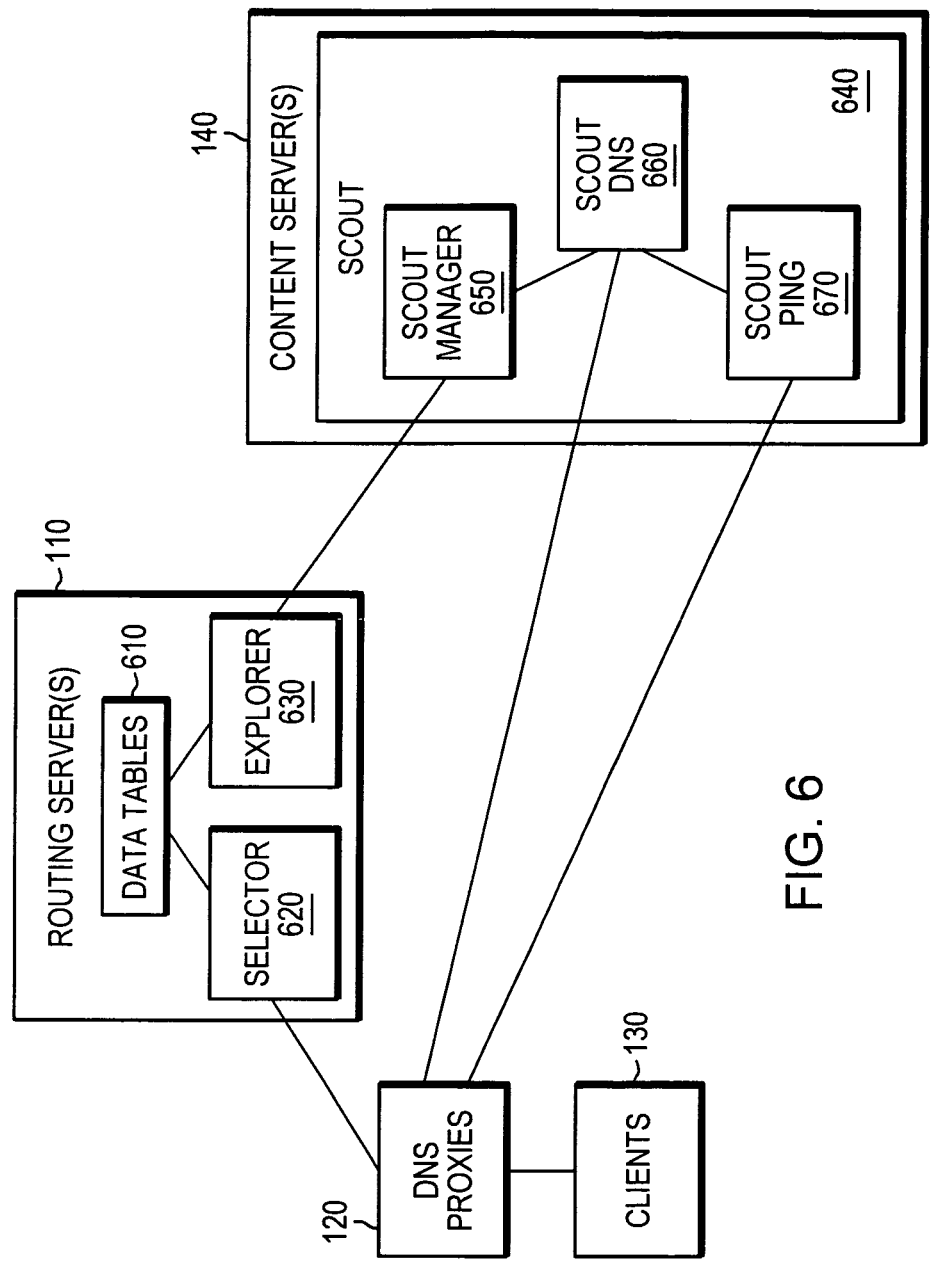
FIG. 6 is a block diagram of a subset of network elements of FIG. 1 depicting various modules executed by the routing servers and content servers.

FIG. 6 is a block diagram depicting various aspects of the components and their interconnections. When asked to do a selection, the routing server 110 makes use of data tables 610 that comprise data ranked by the "goodness" of content servers 140 relative to respective DNS proxies 120 requesting access. The data tables 610 may be implemented in various data structures and help the process to select content servers 140 that (i) serve the requested routed domain, (ii) are operational, and (iii) are not overloaded.

In a background process, the routing server 110 collects information that allows it to construct the data tables 610. The information is obtained by having all or a subset of representative content servers 140, sometimes called "leaders", communicate with respective DNS proxies 120 to determine their "distance" from respective DNS proxies or determine another networking metric, such as a network hops.

The information is sent back from the content server leaders to the routing server 110 where it is integrated into the data tables 610. In one embodiment, the tables are then sorted by increasing distance so that the closest content server appears first in the table.

The routing server 110 returns a set of selections to the DNS proxy 120 making the requests. The selections are typically sent as NS records. The DNS proxy 120 communicates with the selected nodes. The content servers 140 return an A record (address record) when the DNS proxy 120 communicates with them. The A records contain a time-to-live parameter (TTL), which, when set very small, causes the DNS proxy 120 to keep evaluating its choices among the NS records sent to it by the routing server 110. Continual evaluation of the content servers 140 allows the DNS proxy 120 to determine an ordering among the choices sent by the routing server 110, so that it will usually choose the best among the selections; continual evaluation is also good for load balancing and for noticing failures.

The routing server 110 sends a large number of NS records (e.g., 8) when "uncertain" about how good its choices of content servers 140 are; when more certain, the routing server 110 sends a smaller number (e.g., 3). In addition, the TTLs can be varied. A short TTL (e.g., 6 minutes) can be set when the routing server 110 is uncertain about its choices, causing the DNS proxy 120 to get new information from the routing server 110 in the near future, by which time the routing server 110 has more information and the choices it makes will be better. A longer TTL (e.g., 30 minutes) is applied when the routing server 110 is more certain about its choices. For the address records, the corresponding TTLs might be on the order of 15 seconds.

A data collection period, D, is set smaller than the short NS TTL; preferably, the short TTL should be greater than or equal to 3D since this ensures better information when the DNS proxy goes back to the routing server 110. Except as mentioned, data might be collected continually.

The data collection may involve communication between all content server leaders and all routing servers 110 in each period, which means that each routing server 110 learns all new information in each period, even information that was requested by a different routing server 110. The communication is unsynchronized, however, reducing the certainty that each routing server 110 receives exactly the same messages, in which case the tables at the routing servers 110 might diverge, though not significantly. If a routing server 110 fails, part of its recovery may involve communicating with another routing server 110 to get the table relating to the content servers 140 from the other routing server 110; alternatively, recovery may make use of information the routing server 110 stores on its persistent memory (e.g., magnetic disk), on the use of statically provided information, or on a combination of these techniques.

The communication demands on the routing servers 110 are reduced because routing servers only communicate with leaders of locations rather than all content servers. The communication demands can be reduced further by organizing the leaders into a tree and aggregating information by passing it up the tree; only the leaders at the roots of the tree will communicate directly with the routing servers 110.

In one embodiment, the system comprises the following components. At the routing server 110, a selector module 620 responds to DNS requests with NS records using the data tables 610 that are built and maintained by an explorer module 630. The explorer module 630 communicates with a scout module 640, which is executed by the content servers 140. The scout module 640 may be separated into three parts: a scout manager module 650, which communicates with the explorer module 630; a scoutDNS module 660, which returns the address records to the DNS proxies 120; and a scoutPing module 670, which communicates, via a lower-level mechanism, with selected DNS proxies 120 to determine a distance or other network metric between the DNS proxies 120 and the respective content servers 140.

The routing method is based on a number of computations that perform best when the following rules are followed:

1. The explorer module 630 decides what to ask the scout modules 640 to do in the next period. This is referred to as "probe selection". The decision is based on what has happened in the last period (i.e., what the selector module 620 did), what the explorer module 630 has done in the past, and what the data values are in the data tables 610.

2. The scout manager modules 650, based on what they heard from the explorer modules 630 and what they did in previous periods, decide what to do in the next period. This is referred to as "scout probe selection".

3. The explorer module 630, based on what it heard from the scout modules 640 and the present data in the data tables 610, computes the data tables 610 for the next period. This is referred to as "table building".

4. The selector module 620 answers routing requests using tables built for it by the explorer module 630. This is referred to as "selection".

5. The ScoutDNS module 660, based on local information, decides how to answer requests from DNS proxies. This is referred to as "local selection".

Figure 7:
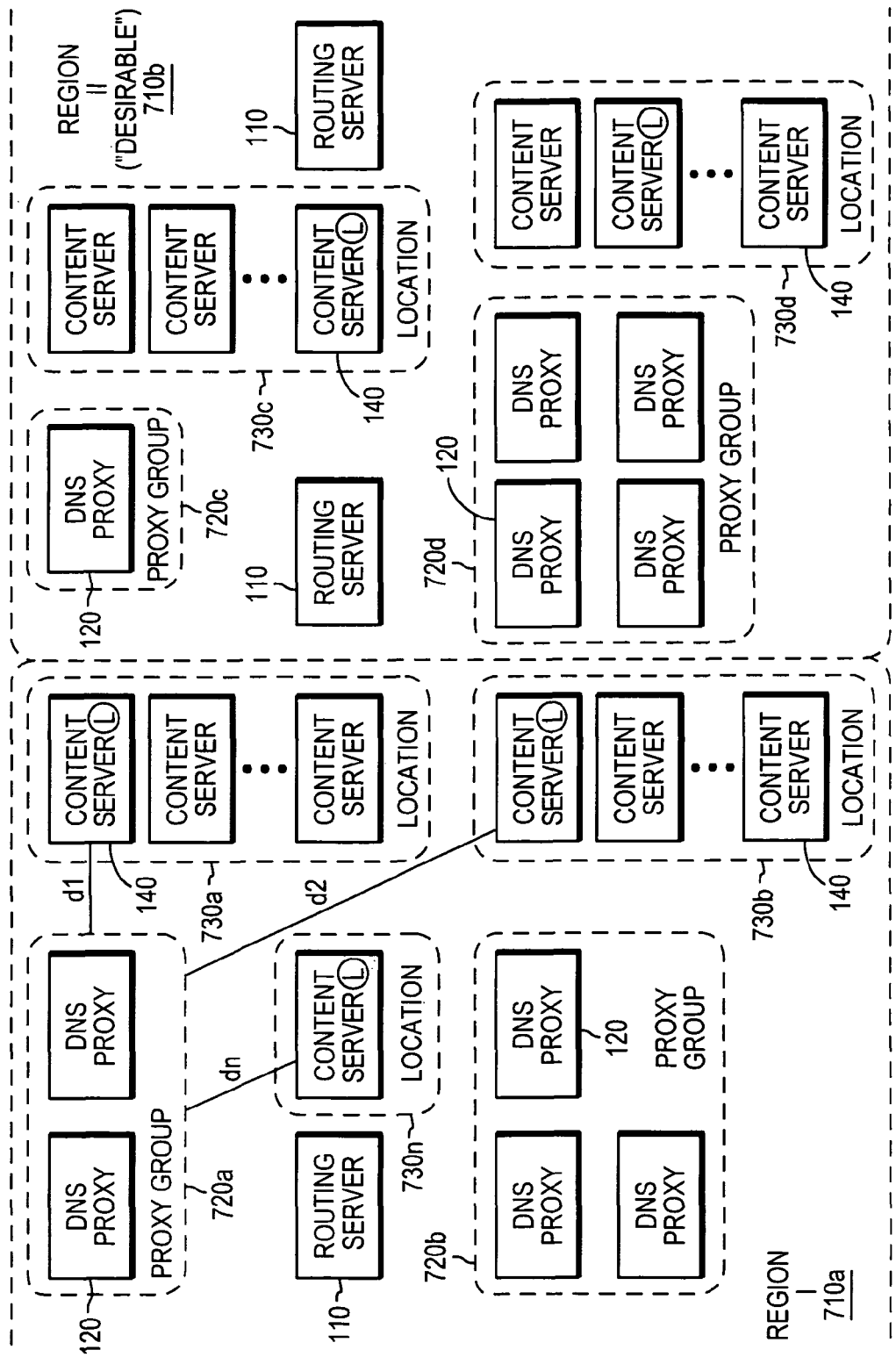
FIG. 7 is a block diagram of a macro perspective of a network arrangement for the modules of FIG. 6.

FIG. 7 is an embodiment of a subset of a topology in which a subset of a network, such as the Internet, may be organized. The embodiments of the network devices of FIG. 6 are applicable to the devices of FIG. 7. Referring to FIG. 7, the content servers 140, are gathered into "locations" 730, where locations match physical reality. Note that all content servers 140 in a location are similar enough from a routing perspective that it makes sense to treat them as a group. A location might be a single POP (Point of Presence), but it might also be a group of closely located POPs.

Each location belongs to a particular "region", such as Region I 710*a* and Region II 710*b*. A region represents a meaningful geographic area, e.g., the eastern United States. The routing servers 110 are depicted in regions, but in practice, are not thought of as being in regions. A routing server 110 may base selections of content servers 140 on regions 710 when nothing (or very little) is known about a DNS proxy 120 requesting service. Certain regions are marked as "desirable" (e.g., Region II); content servers in desirable regions are generally selected when nothing is known about the proxy. One way to initialize the system is to separate the system into regions, for example, separating a system spanning the United States into four regions—one for each time zone of the United States. Then some subset of the regions is indicated as being desirable.

A system operator can add regions and change desirability, but there is an upper bound on how many regions should be considered desirable. In one embodiment, the system operator is also able to indicate that certain locations and/or sub-regions within the region are desirable.

A location 730 consists of a number of content servers 140, each of which stores content for some routed domains. A location 730 is considered to store all the routed domains stored by the content servers 140 that are in that location; thus, a routed domain might be stored multiple times at the location.

In the preferred embodiment, each location 730 has a "leader", designated in FIG. 7 by an "L". The leader may be directed by a routing server 110 to perform all probing for the entire location.

Additionally, the content servers in each location can be subdivided into groups, each containing some of the content servers in the location. In one embodiment, a location consists of just one group, containing all content servers in the location. Alternatively, a location might consist of several groups. Each group has a group leader; the scout module 640 at the group leader provides the routing servers with information regarding the health and busy-ness of the nodes within the group storing a particular occurrence of the routed domain.

The routing servers maintain information for the groups indicating what RDs are stored by group members, the status of the members, and also information about how to build the NS records for the group leader. The latter information allows the routing servers to construct the NS records that are returned to the DNS proxies, so that the proxies can communicate with the scout modules 640 (FIG. 6) at the group leaders.

The group leaders do the local selection; this is the second step of routing (i.e., FIG. 1, step A4). The scoutDNS module 660 at the group leader uses local information about the status of group members and about which members store what RDs to decide which group member's IP address should be returned to the DNS proxy. Thus the second step allows a last-minute routing decision to be made that can take into account very recent information about the status of group members. The group leader returns just one address record, but more address records could be returned, if desired.

The IP addresses of DNS proxies 120 include structure, allowing them to be grouped based on prefixes of their IP addresses, IP addresses, or other information. The information about good locations is stored per proxy group. Typically, the proxies in the group are sufficiently close that they can be treated as a unit for purposes of establishing distances from locations.

The routing servers 110 maintain information about DNS proxies 120 and their relationships to the content servers 140. The information may be maintained in various data structures or files, such as the tables of FIG. 3.

FIG. 8 is an illustration of a data structure used by the routing server 110 to store information. This data structure is referred to as a proxy table 800. There is typically one such table per proxy group 720 (FIG. 7). The tables store distances of proxy groups 720 to locations 730 (FIG. 7), representing how far a respective location is from a proxy group. A field in each record of the table stores the number of probes that have been done by that location to members of that proxy group; additionally the record may store other information about probes, e.g., the N most recent values received from that location leader for that proxy group. Alternatively, other mathematical statistics indicating the results from the probes may be recorded. The table may store a probe count per region; this is the sum of the probe counts for all locations in that region. Also the table may be marked as "complete" or "incomplete". A complete table has a region-probe count greater than or equal to 1; in an alternative embodiment, more than one probe per region is required before a table is marked complete.

In addition to the proxy table 820, the routing servers 110 have the following tables (not shown):

Region table: lists the desirable regions.

Location table: lists the region of each location.

RD table: For each RD (routed domain), a bit map that tracks the locations storing RD content; if the bit is ON, the corresponding location stores the routed domain at at least one content server in the location that is on-line and not overloaded.

Content server-group table: For each group of content servers, gives its location, information about how to build NS records for the group leader, and information about the RDs served by group members and status (up, overloaded, down) of group members.

Reduced-proxy table: condensed version of the proxy table 820 in which entries are sorted by distance from the proxy group; the reduced table is used by the selector module 620 to respond to requests from the DNS proxy.

Referring again to FIG. 6, the following discussion assumes that the selector module 620 may run on a different machine or different processor (within a multiprocessor) than the explorer module 630. The selector module 620 uses the reduced-proxy table to make its selection, since this table is optimized for fast look up; the explorer module 630 builds reduced-proxy tables for the selector module 620 at that routing server 110 periodically. The reduced tables are much smaller than the full proxy tables used at the explorer module 630, so that there is a better chance that they will fit into primary memory. A reason for limiting the reduced-proxy table so that all the selector module tables will fit into primary memory is that this allows much faster response to requests from DNS proxies. If necessary, only the top part of the tables (containing the high-ranking entries, i.e., entries for desirable locations for the respective proxy group) may be stored in primary memory, with the remaining entries kept on secondary storage accessible to the selector module 620. Or, the explorer module 630 may retain only the high-ranking entries in the reduced-proxy table. For example, in a large network, the table might contain the top 10% of entries; in a small network, the table might contain a larger percent. The reduced-proxy table can be written to a database and recovered in the event of a system or network crash and/or used to initialize a new routing server. both the reduced-proxy table and non-reduced proxy table can be computed off-line and provided to the system at startup or during operation; the system can refine the tables with real-time information during operation.

The selector module 620 computes the proxy group for the DNS proxy contacting the routing server 110 in the request. If there is no proxy table for this group, it uses the default proxy table. The selector module 620 goes through the entries in the table in some order that causes it to examine high-rated locations (ones that are good for that proxy group) before lower-ranked locations); it might do this by examining locations in sorted order, or it might choose among the "best" locations randomly or round robin before considering less desirable locations. For each location, the selector module 620 checks the RD table to see whether that location can be used (i.e., the corresponding bit is ON). If the bit is ON, the selector module 620 consults the content server-group table to find the content server groups that have members that store content for the RD and are not overloaded. In one embodiment, the selector module 620 accepts content server groups that match up to some limit, except that it selects only one content server group per location and only accepts content servers that are not overloaded. The selector module 620 stops as soon as it has N groups, where N depends on how good the groups are. For example, if the groups are very good it will stop when it has 3 groups while if the groups are less desirable, it stops when it has 8 groups. Also if it has run out of good prospects (e.g., in the top X %) but has found two good choices, it selects those two. If the selector module 620 is using a table where lower-ranked entries are kept on disk and it runs out of entries before finding two choices, it will read the rest of the table from disk; accessing the disk storage will be acceptable if this happens rarely, which will be the case provided sufficient information in kept in primary memory (such as the top 10% of entries in a large system). If the selector module 620 is using a table that contains only the top-ranked entries and it runs out of entries before finding two choices, it communicates with the explorer module 630 to do the rest of the selection. This communication is acceptable provided it is rare. In an alternative embodiment, the selector makes use of the default proxy table if it runs out of entries. This table is always complete in the sense that it store all locations.

In one embodiment, the selector module 620 selects content servers 140 that are not overloaded, unless it is unable to find enough other choices (e.g., 2). In this case, the selector module 620 may select overloaded content servers if the non-overloaded content servers that store the requested RD are very far away.

Once the DNS proxy 120 has received the selected choices of content server groups, local selection can take place. The DNS proxy 120 contacts the scoutDNS module 660 on the leader of the content server group. The scoutDNS module 660 has a table (not shown) listing all the IP addresses for the content servers in the content server group that store that routed domain, together with information about status of group members. The scoutDNS module 660 selects among the content servers storing the requested domain; this step takes content server status into account, and attempts to do load balancing, using a technique such as selecting randomly or round-robin.

Probe selection by the explorer module 630 has a number of goals. It needs to direct probes to particular proxy groups 720 in order to collect information so that it can produce more accurate tables. However, the explorer modules 630 must avoid sending too many probes to particular proxies to avoid overloading the DNS proxies or the network with probes. Additionally, the explorer modules 630 must avoid asking scout modules 640 to do more probing than is reasonable in a routing period, and also needs to keep the size of messages that are exchanged with scout modules under control.

At the end of a period, an explorer module 630 knows all the DNS-proxy requests received by the selector module 620 at the same routing server 110. It also knows its current tables and what occurred in the previous period.

An explorer module 630 only sends probes to proxy groups 720 that are "active"; a proxy group is "active" if some member of the group has made a request "recently", e.g., within the last 6 periods. There is an assumption that if the routing server 110 hears from a member of a proxy group, other requests will follow.

The explorer module 630 attemps to send probes to all active groups. If this is not possible (because some location leaders will be asked to do more work than is reasonable in a routing period), it favors "new" proxy groups over the others. A new proxy group is one without a table or where some regions have not been probed. If it needs to choose among the new groups, or among the other groups, it will favor (i) groups where less is known (e.g., fewer locations have been probed for the chosen group), (ii) busier groups, or (iii) groups where an "interesting" change has occurred, e.g., a location that formerly appeared to not be good for that proxy group now appears to be good.

For each selected proxy group, the explorer module 630 chooses N locations to send probes to that group. If a group has no table, the explorer module 630 chooses a prober from each region; if there are too many regions to do them all, the explorer module 630 selects locations from desirable regions before it selects locations from the other regions. Further, the explorer module 630 selects the probers from regions that have not been explored (i.e., region-count of zero) before selecting probers from regions with a larger region-probe count. If the group has a complete table, but some locations have not yet done probes, the probers are chosen based on some weighting, where some probes are sent to good locations and others are sent to locations that have not yet done probes. If all locations have done probes, most probes are sent to good locations for that proxy group, but a few are chosen from other locations. For example, if N=4, 3 probes might be chosen from the top 25% of locations, and the remaining probe from the other 75%.

The explorer module 630 also selects the member or members of the proxy group to receive the probes. The chosen proxy or proxies are typically among the proxies that made a request in the recent past.

The explorer module 630 typically chooses one proxy among the proxies. The explorer module 630 then sends information about its choices to the locations leaders 740, where it is processed by the scoutManager module 650 executed by the location leader. It may send the leader only its own instructions (about what probes its scoutManager module 650 should perform) or it may send the leaders complete information about probes.

The probe period is preferably large enough so there is no problem with the traffic between content server leaders and the routing servers 110, but small enough to ensure good information to guide future choices. Further, the probe period is preferably large enough to probe from each desirable region (in the case of a new proxy group) without exceeding the bound on how often a proxy can be probed. For example, suppose there are three desirable regions and it has been determined, possibly heuristically, that proxies should be probed less frequently than every 15 seconds. Then, the explorer module 630 could set a probe period of 2 minutes, since this allows each desireable region to be probed twice while ensuring that the limit on probes is not exceeded. However, a small period (such as 2 minutes) may be used even when there are too many regions to probe in that period, since the information collected is of use even when it is incomplete. It should be noted that more than one probe is generally performed to get a reasonable answer.

Scout module 640 determines which proxies should be probed from among the selections provided by the routing server 110. The scoutManager module 650 receives information from each routing server 110 about what probes to execute in the next period. This information may contain only the instructions for that scout module, or it may contain more complete information such as the instructions for that scout module plus a list of all proxies chosen for probes by that routing server.

The following discussion concentrates on work that is done by the scoutManager modules 650 in leaders of locations 730 (FIG. 7). The scoutManager module 650 combines the requests it receives from all, or a subset of all, the routing servers 110. The scoutManager module 650 has intelligence to discard some of the requests in the event that it is asked to do more than it can manage or to reduce the number of probes being directed to particular DNS proxies 120. Therefore, to ensure the scoutManager module 650 discards probes to known proxy groups before discarding probes to new ones, the explorer modules 630 in the routing servers 110 indicate which groups are new.

Since the routing servers 110 choose DNS proxies 120 independently, there is a possibility that some proxy (or proxy group) will be overwhelmed with probes. If scoutManagers 650 receive complete instructions from each routing server, they can reduce the number of probes sent to particular proxies to ensure that the limit on probes is enforced. However, if scoutManagers 650 receive only their own instructions, they cannot do this kind of global decision making. Therefore, in an embodiment in which incomplete probe information is sent to scoutManagers, routing servers (i) are very conservative in the number of probes they request for particular proxies, (ii) attempt to choose different members of proxy groups to receive the probes (i.e., if possible, different routing server choose different proxies to probe), and (iii) attempt to choose the same locations to do the probing. The latter is possible because the tables at the routing servers contain approximately the same information.

The following discussion describes details regarding table building in the routing servers 110. At the end of a period, the explorer modules 630 combine all the information they have received during that period from respective leaders of locations 730 and leaders of content server groups 140. From leaders of locations 730, the explorer modules 630 get the probe information; from the leaders of content server groups, the explorer modules 630 get routed domain and status information for content servers in the group.

An explorer module 630 builds proxy group tables 610 as follows. For each location that executed a probe it increments the probe count for that location (FIG. 8) and assigns the location a value obtained by combining the new information with the information previously computed for that location, if any. A location has no information if this is a new table, or if the current probe count for the location is zero. If the location already has a computed value, its new value is combined with the old one in a manner that retains past history but favors the present; otherwise, the new value replaces the old value.

After adding all the information from new probes to the table, the explorer module computes an average value for each region, consisting of the average of all values for locations that have probe counts greater than zero. Then it stores that value in all locations in the region that have probe counts of zero.

Finally, the explorer assigns values to locations in regions where there have been no probes (i.e., the region-count=0). In one embodiment, locations in desirable regions receive better values than some computed network average, while those in undesirable regions receive values that are worse than the computed network average.

After building the new tables, the explorer module 630 sorts the table and produces the reduced version of the table, which is used by the selector module in the next routing period.

The routing server 110 also rebuilds its other tables. For example, the routing server 110 may have heard about new routed domains (the scout managers 650 send this information) and also about new regions 710 (FIG. 7), new locations 730, or new content server groups within locations 730. The routing server 110 may also hear about the status of group members. And, the routing server 110 may not hear at all from certain groups; if this happens "enough" (e.g., twice in a row), the explorer module 630 marks the corresponding group as off-line in the respective tables. If the routing server 110 learns of a new location 730, it adds the new location to the tables and gives the new location an inferred value equal to the value of its region 710 in the corresponding table.

The explorer module 630 is also responsible for creating the data table 610 used by the selector module 620 when it encounters an unknown DNS proxy group. This is accomplished as follows. All locations in the desirable regions are given one distance, d1. All other locations are given a different distance, d2. The table is then sorted so that (i) locations with distance d1 appear earlier in the table than those with distance d2, and (ii) locations from different regions with the same distance are interleaved in the table. For example, if there are three desirable regions, then the first three entries are locations from those regions, and so on. This way of building the data table 610 makes it likely that the selector module 620 provides responses to a request from an unknown DNS proxy group with supernodes in all desirable regions.

An externally provided list of DNS proxies can be used to prime construction of the data table 610. Alternatively, various other protocols, such as IGP (Interior Gateway Protocol) (e.g., OSPF—Open Shortest Path First) or EGP (Exterior Gateway Protocol) (e.g., BGP—Border Gateway Protocol) can be employed to build the data table 610.

It should be understood that the modules and processes described herein are typically implemented in computer program instructions executable by a processor. The computer program instructions are stored on local or remote computer readable media, which may be RAM, ROM, CD-ROM, magnetic disk, or other computer readable storage device.

The routing servers 110 and content servers 140 may be various forms of computer networking devices or software modules executed by the computer networking devices. The computer networking devices and/or software modules located on a computer network may be referred to as nodes.

The modules and processes described herein in conjunction with the routing server(s) 110 and content servers 140 may be distributed among multiple nodes. Various embodiments apportion various amounts of processing and table management to the routing server(s) 110 and the content servers. Further, in computer networks in which the DNS proxies are accessible to the system described herein, portions of the modules, processes, or tables may be supported by the DNS proxies.

While this invention has been particularly shown and described with references to preferred embodiments thereof, it will be understood by those skilled in the art that various changes in form and details may be made therein without departing from the scope of the invention encompassed by the appended claims.

The invention claimed is:

1. A method for identifying content servers for providing content to clients, comprising:
   transmitting messages from content servers in a content distribution network (CDN) to Domain Name System (DNS) proxies;
   receiving, at the content servers, responses from the DNS proxies that include network service data indicating a service distance between a respective content server and a respective DNS proxy;
   feeding the network service data from the content servers to at least one routing server;
   receiving, at a first DNS proxy, a request from a first client for an Internet Protocol (IP) address of a content server to provide content to the first client;
   receiving, at the routing server, a request from the first DNS proxy for an identification one or more content servers to provide content to the first client that contacted the first DNS proxy;
   based on the data received from the content servers, determining at the routing server one or more content servers in the CDN that are best-suited for providing content to the first client; and
   returning a set of one or more selections of content servers to the first DNS proxy for use by the first DNS proxy to respond to the request from the first client, wherein each selection is associated with a time-to-live (TTL) and wherein the time length of the TTLs is based on a confidence of the routing server in the set of selections.

2. The method according to claim 1 wherein transmitting messages from the content servers comprises transmitting messages to the DNS proxies in a controlled manner.

3. The method according to claim 2 wherein transmitting messages in a controlled manner comprises transmitting messages at limited times to avoid congesting the DNS proxies.

4. The method according to claim 1 further comprising:
populating, based on the network service data, a plurality of tables forming a map of the CDN; and
wherein determining comprises determining the one or more content servers in the CDN that are best-suited for providing content to the first client based further on the map of the CDN.

5. The method according to claim 1 wherein the network service data comprise at least one of: response times, load, status, or filtered data corresponding to the DNS proxies.

6. The method according to claim 1 further comprising computing weightings based on the network service data fed to the routing server by the respective content servers, the weightings corresponding to content servers and being used by the routing server to determine an ordering of the content servers used for selecting choices of content servers.

7. The method according to claim 6 wherein the weightings are further based on at least one of the following: manually entered information, content server IP address information, or peer relationships among different content servers.

8. The method according to claim 6 wherein the service distance is determined based on at least one of the following: geography, network congestion, or network hops from the content servers to respective DNS proxies.

9. The method according to claim 6 wherein computing the weightings comprises ordering the weightings in a sequence according to a metric influencing future content server selection activities.

10. The method according to claim 6 further comprising separating the weightings into a best content server selection group and a set of other content servers to handle cases where the best content server selection group is unable to provide requested content.

11. The method according to claim 6 further comprising periodically updating the weightings.

12. The method according to claim 1 further comprising varying a number of selections in the set of one or more selections of content servers returned to the first DNS proxy, wherein the number of selections returned to the first DNS proxy is based on a confidence of the routing server in the determined one or more content servers that are best-suited for providing content to the first client.

13. The method according to claim 1 wherein the content servers are organized in groups.

14. The method according to claim 13 wherein the groups are organized by geographical relationships.

15. The method according to claim 13 wherein transmitting the messages from the content servers comprises transmitting messages only from representative content servers from each group to the DNS proxies.

16. The method according to claim 15 further comprises determining the one or more content servers in the CDN that are best-suited for providing content to the first client based on knowledge of an overall network model.

17. The method according to claim 16 wherein the overall network model includes knowledge of the proximity of the groups.

18. The method according to claim 1 wherein transmitting the messages from the content servers comprises transmitting ping messages.

19. The method according to claim 1 wherein transmitting the messages from the content servers comprises transmitting traceroute messages.

20. The method according to claim 1 wherein transmitting the messages from the content servers comprises transmitting DNS requests.

21. The method according to claim 1 wherein the service distance comprises a time taken for the content servers to communicate with the DNS proxies.

22. A system for identifying content servers for providing content to clients, comprising:
content servers in a content distribution network (CDN) having content for clients;
Domain Name System (DNS) proxies in the CDN, wherein a first DNS proxy is configured to receive a request from a first client for an Internet Protocol (IP) address of a content server to provide content to the first client; and
at least one routing server configured to (i) direct the content servers to transmit messages to the DNS proxies to cause the network nodes to respond with network service data indicating a service distance between a respective content server and a respective DNS proxy, and responses providing the network service data, and feed back the network service data from the content servers to respective routing servers, (ii) to use the network service data to determine one or more content servers in the CDN that are best-suited for providing content to the first client, and (iii) return a set of one or more selections of content servers to the first DNS proxy for use by the first DNS proxy to respond to the request of the first client, wherein each selection is associated with a time-to-live (TTL) and wherein the time length of the TTLs is based on a confidence of the routing server in the set of selections.

23. The system according to claim 22 wherein the routing server directs the content servers to send messages to the DNS proxies in a controlled manner.

24. The system according to claim 23 wherein the routing server directs the content servers in a controlled manner to limit the number of messages received by the DNS proxies to avoid congesting the DNS proxies.

25. The system according to claim 23 wherein the routing server directs the content servers in a controlled manner to limit the number of times content servers send messages to DNS proxies.

26. The system according to claim 22 wherein wherein the routing server is configured to populate, based on the network service data, a plurality of tables forming a map of the CDN, and determine the one or more content servers in the CDN that are best-suited for providing content to the first client based further on the map of the CDN.

27. The system according to claim 22 wherein the network service data comprise at least one of: response times, load, status, or filtered data corresponding to the DNS proxies.

28. The system according to claim 22 wherein the routing server computes weightings based on the network service data fed back by the respective content servers, the weightings corresponding to content servers and being used by the routing server to determine an ordering of the content servers used for determining choices of content servers.

29. The system according to claim 28 wherein the weightings are based on at least one of the following: manually entered information, content server IP address information, or peer relationships among different content servers.

30. The system according to claim 28 wherein the service distance is determined based on at least one of the following:

geography, network congestion, or network hops from content servers to respective DNS proxies.

31. The system according to claim 28 wherein the routing server orders the weightings in a sequence according to a metric influencing future content server selection activities.

32. The system according to claim 28 wherein the weightings are separated into a best content server selection group and a set of other content servers to handle cases where the best content server selection group is unable to provide requested content.

33. The system according to claim 22 wherein the weightings are updated periodically.

34. The system according to claim 22 wherein the routing server is configured to vary a number of selections in the set of one or more selections of content servers returned to the first DNS proxy, wherein the number of selections returned to the first DNS proxy is based on a confidence of the routing server in the determined one or more content servers that are best-suited for providing content to the first client.

35. The system according to claim 22 wherein the content servers are organized in groups.

36. The system according to claim 35 wherein the groups are organized by geographical relationships.

37. The system according to claim 35 wherein the routing server directs representative content servers from each group to send messages to the DNS proxies.

38. The system according to claim 37 wherein knowledge of an overall network model determines which representative content servers will be directed to send messages.

39. The system according to claim 38 wherein the network model includes knowledge of the proximity of the groups.

40. system according to claim 22 wherein the messages comprise ping messages.

41. The system according to claim 22 wherein the messages comprise at least one of the following: traceroute messages or DNS requests.

42. The system according to claim 25 wherein the choices are limited based on time taken for the content servers to communicate with the DNS proxies.

43. A system for identifying content servers in a content distribution network (CDN) for providing content to clients comprising:
means for directing content servers to send messages to Domain Name System (DNS) proxies in the CDN;
means for receiving, at the content servers, responses from the DNS proxies that include network service data indicating a service distance between a respective content server and a respective DNS proxy;
means for feeding the network service data from the content servers to at least one routing server;
means for receiving, at the routing server, a request from a first DNS proxy for an identification one or more content servers to provide content to a first client that contacted the first DNS proxy;
based on the network service data received from the content servers, means for determining at the routing server one or more content servers in the CDN that are best-suited for providing content to the first client; and
means for providing a set of one or more selections of content servers to the first DNS proxy for use by the first DNS proxy to respond to the request of the first client, wherein each selection is associated with a time-to-live (TTL) and wherein the time length of the TTLs is based on a confidence of the routing server in the set of selections.

44. An apparatus for identifying content servers in a content distribution network (CDN) for providing content to clients, comprising:
an interface coupled to a network;
memory storing data; and
a processor coupled to the interface and the memory, the processor executing computer program instructions to:
direct content servers (i) to send messages to Domain Name System (DNS) proxies in the CDN to cause the DNS proxies to respond with network service data indicating a service distance between a respective content server and a respective DNS proxy, and receive responses including the network service data from the DNS proxies;
receive the network service data from the content servers;
receive a request from a first DNS proxy for an identification one or more content servers to provide content to a first client that contacted the first DNS proxy;
based on the network service data received from the content servers, determine one or more content servers in the CDN that are best-suited for providing content to the first client; and
provide a set of one or more selections of content servers to the first DNS proxy for use by the first DNS proxy to respond to the request of the first client, wherein each selection is associated with a time-to-live (TTL) and wherein the time length of the TTLs is based on a confidence in the set of selections.

45. The apparatus according to claim 44 wherein the computer program instructions direct the content servers to send the messages to the DNS proxies in a controlled manner.

46. The apparatus according to claim 44 wherein the computer program instructions further comprise instructions to:
populate, based on the network service data, a plurality of tables forming a map of the CDN; and
determine one or more content servers in the CDN that are best-suited for providing content to the first client based further on the map of the CDN.

47. The apparatus according to claim 44 wherein the computer program instructions further comprise instructions to compute weightings based on the network service data received from the content servers.

48. The apparatus according to claim 47 wherein the computer program instructions further comprise instructions to update the weightings periodically.

49. The apparatus according to claim 44 wherein the computer program instructions further comprise instructions to organize the content servers in groups.

50. The apparatus according to claim 49 wherein the groups are organized by geographical relationships.

51. The apparatus according to claim 44 wherein the computer program instructions select representative content servers to send messages to the DNS proxies.

52. By a routing server, a method for identifying content servers in a content distribution network (CDN) for providing content to clients, the method comprising:
directing content servers to (i) send messages to Domain Name System (DNS) proxies in the CDN to cause the DNS proxies to respond with network service data indicating a service distance between a respective content server and a respective DNS proxy and (ii) receive responses including the network service data from the DNS proxies;
receiving the network service data from the content servers; and receiving a request from a first DNS proxy for an identification one or more content servers to provide content to a first client that contacted the first DNS proxy;

based on the network service data received from the content servers, determining one or more content servers in the CDN that are best-suited for providing content to the first client; and providing a set of one or more selections of content servers to the first DNS proxy for use by the first DNS proxy to respond to the request of the first client, wherein each selection is associated with a time-to-live (TTL) and wherein the time length of the TTLs is based on a confidence in the set of selections.

53. The method according to claim 52 wherein directing the content servers to send the messages to the DNS proxies comprises directing the content servers to send messages to the DNS proxies in a controlled manner.

54. The method according to claim 52 further comprising:
populating, based on the network service data, a plurality of tables forming a map of the CDN; and
wherein determining comprises determining the one or more content servers in the CDN that are best-suited for providing content to the first client based further on the map of the CDN.

55. The method according to claim 52 further comprising computing weightings based on the network service data fed back to the routing server by the content servers.

56. The method according to claim 55 further comprising updating the weightings periodically.

57. The method according to claim 52 wherein the content servers are organized in groups.

58. The method according to claim 57 wherein the groups are organized by geographical relationships.

59. The method according to claim 52 wherein directing content servers comprises selecting representative content servers to send messages to the DNS proxies.

60. A computer program product, comprising:
a non-transitory computer usable medium for storing data; and
a set of computer program instructions embodied on the computer usable medium, including instructions to:
direct content servers in a content distribution network (CDN) (i) to send messages to Domain Name System (DNS) proxies in the CDN to cause the DNS proxies to respond with network service data indicating a service distance between a respective content server and a respective DNS proxy, and (ii) to receive responses including the network service data from the DNS proxies;
receive the network service data from the content servers;
receive a request from a first DNS proxy for an identification one or more content servers to provide content to a first client that contacted the first DNS proxy;
based on the data received from the content servers, determine one or more content servers in the CDN that are best-suited for providing content to the first client; and
provide a set of one or more selections of content servers to the first DNS proxy for use by the first DNS proxy to respond to the request of the first client, wherein each selection is associated with a time-to-live (TTL) and wherein the time length of the TTLs is based on a confidence in the set of selections.

61. The computer program product according to claim 60 wherein the computer program instructions further comprise instructions to direct the content servers to send messages to the DNS proxies in a controlled manner.

62. The computer program product according to claim 60 wherein the computer program instructions further comprise instructions to:
populate, based on the network service data, a plurality of tables forming a map of the CDN; and
determine the one or more content servers in the CDN that are best-suited for providing content to the first client based further on the map of the CDN.

63. The computer program product according to claim 60 wherein the computer program instructions further comprise instructions to compute weightings based on the data received from the content servers.

64. The computer program product according to claim 60 wherein the computer program instructions further comprise instructions to update the weightings periodically.

65. The computer program product according to claim 60 wherein the computer program instructions further comprise instructions to organize the content servers in groups.

66. The computer program product according to claim 65 wherein the groups are organized by geographical relationships.

67. The computer program product according to claim 66 wherein the computer program instructions further comprise instructions to select representative content servers to send messages to the DNS proxies.

68. An apparatus for identifying content servers a content distribution network (CDN) for providing content to clients, comprising:
means for directing content servers to (i) send messages to Name System (DNS) proxies in the CDN to cause the DNS proxies to respond with network service data indicating a service distance between a respective content server and a respective DNS proxy, and (ii) receive responses including the network service data from the DNS proxies;
means for receiving the network service data from the content servers;
means for receiving a request from a first DNS proxy for an identification one or more content servers to provide content to a first client that contacted the first DNS proxy;
based on the network service data received from the content servers, means for determining one or more content servers in the CDN that are best-suited for providing content to the first client; and
means for providing a set of one or more selections of content servers to the first DNS proxy for use by the first DNS proxy to respond to the request from the first client, wherein each selection is associated with a time-to-live (TTL) and wherein the time length of the TTLs is based on a confidence in the set of selections.

\* \* \* \* \*